United States Patent
Plane et al.

(10) Patent No.: US 11,890,593 B2
(45) Date of Patent: Feb. 6, 2024

(54) CATALYTIC CONVERTER

(71) Applicant: University of Leeds, Leeds (GB)

(72) Inventors: John Maurice Campbell Plane, Leeds (GB); Hu Li, Leeds (GB); Alexander James, Leeds (GB)

(73) Assignee: University of Leeds, Leeds (GB)

( * ) Notice: Subject to any disclaimer, the term of this patent is extended or adjusted under 35 U.S.C. 154(b) by 152 days.

(21) Appl. No.: 17/421,910

(22) PCT Filed: Jan. 13, 2020

(86) PCT No.: PCT/GB2020/050062
§ 371 (c)(1),
(2) Date: Jul. 9, 2021

(87) PCT Pub. No.: WO2020/148522
PCT Pub. Date: Jul. 23, 2020

(65) Prior Publication Data
US 2022/0097026 A1    Mar. 31, 2022

(30) Foreign Application Priority Data
Jan. 14, 2019 (GB) .................................. 1900482

(51) Int. Cl.
| | | |
|---|---|---|
| *B01J 23/00* | (2006.01) | |
| *B01J 21/16* | (2006.01) | |
| *B01D 53/94* | (2006.01) | |
| *B01J 23/745* | (2006.01) | |
| *B01J 37/03* | (2006.01) | |
| *B01J 37/08* | (2006.01) | |
| *F01N 3/20* | (2006.01) | |
| *F01N 3/28* | (2006.01) | |

(52) U.S. Cl.
CPC ............ *B01J 21/16* (2013.01); *B01D 53/945* (2013.01); *B01D 53/9418* (2013.01); *B01J 23/745* (2013.01); *B01J 37/038* (2013.01); *B01J 37/08* (2013.01); *F01N 3/2066* (2013.01); *F01N 3/2803* (2013.01); *B01D 2255/2047* (2013.01); *B01D 2255/20738* (2013.01); *B01D 2255/30* (2013.01); *F01N 2370/02* (2013.01); *F01N 2610/02* (2013.01)

(58) Field of Classification Search
None
See application file for complete search history.

(56) References Cited

U.S. PATENT DOCUMENTS
3,990,998 A    11/1976 DeLuca et al.

FOREIGN PATENT DOCUMENTS
JP    H0531357    *    2/1993

OTHER PUBLICATIONS

Merriam-Webster. "Catalytic Converter". 2023. (Year: 2023).*
Delvigne, et al. "Olivines, Their Pseudomorphs and Secondary Products". Pedologie. 3. 247-309. (1979). (Year: 1979).*
Search Report dated Jul. 12, 2019 in Great Britain Patent Application No. GB1900482.9.
EEA, "Air quality in Europe," Copenhagen, Denmark, ISSN 1977-8449 (2017).
Frankland et al., "Uptake of acetylene on cosmic dust and production of benzene in Titan's atmosphere," Icarus, 278, 88-99, doi:https://doi.org/10.1016/j.icarus (2016).
Frankland et al., "CO oxidation and $O_2$ removal on meteoric material in Venus' atmosphere," Icarus, 296, 150-162, doi:https://doi.org/10.1016/j.icarus (2017).
Frisch et al., Gaussian 16 Rev. B.01, edited, Wallingford, CT (2016).
Hoek et al., "Association between mortality and indicators of traffic-related air pollution in the Netherlands: a cohort study," Lancet (London, England), 360(9341), 1203-1209, doi:10.1016/s0140-6736(02)11280-3 (2002).
James, "Impacts of Meteoric Material on Earth's Atmosphere: Laboratory studies with Atmospheric Implications," University of Leeds, School of Chemistry (2016).
James et al., "Synthesis and characterisation of analogues for interplanetary dust and meteoric smoke particles," J. Atmos. Sol.-Terr. Phys., doi:http://dx.doi.org/10.1016/j.jastp (2017).
Kašpar et al., "Automotive catalytic converters: current status and some perspectives," Cat. Today, 77(4), 419-449, doi:https://doi.org/10.1016/S0920-5861(02)00384-X (2003).
Krasnopolsky, V. A. (2007), "Chemical kinetic model for the lower atmosphere of Venus," Icarus, 191(1), 25-37, doi:https://doi.org/10.1016/j.icarus.2007.04.028 (2007).
Long et al., "Reaction mechanism of selective catalytic reduction of NO with NH3 over Fe-ZSM-5 catalyst," J. Cat., 207(2), 224-231, doi:https://doi.org/10.1006/jcat.2002.3528 (2002).
Ntziachristos et al., "Implications of diesel emissions control failures to emission factors and road transport NOx evolution," Atmos. Env., 141, 542-551, doi:https://doi.org/10.1016/j.atmosenv.2016.07.036 (2016).
Saunders et al., "Interactions of meteoric smoke particles with sulphuric acid in the Earth's stratosphere," Atmos. Chem. Phys., 12(10), 4387-4398, doi:10.5194/acp-12-4387-2012 (2012).
Zhang et al., "NH3-SCR of NO over one-pot Cu-SAPO-34 catalyst: Performance enhancement by doping Fe and MnCe and insight into N2O formation," Appl. Cat. A: General, 543, 247-256, doi:https://doi.org/10.1016/j.apcata.2017.06.021 (2017).

(Continued)

*Primary Examiner* — Sheng H Davis
(74) *Attorney, Agent, or Firm* — Snell & Wilmer L.L.P.

(57) ABSTRACT

A catalytic converter including a catalyst, the catalyst comprising a material of olivine composition, an engine comprising this catalytic converter and an method of producing nitrogen from NOx comprising the catalytic reduction of NOx by a catalyst comprising of a material of olivine composition. In addition, the use of a material of olivine composition in a catalytic reduction of NOx and a method of manufacture of a catalytic converter comprising adding the catalyst to a wash coat, applying the catalyst containing wash coat to a substrate and annealing the coated substrate.

18 Claims, 12 Drawing Sheets

(56) References Cited

OTHER PUBLICATIONS

Shi et al., "Inhibitory effect of SO2 on side reactions of NH3-SCR over divine," Catal. Sci. Technol., pp. 3613-3623 (2015).

\* cited by examiner (a)

(b)

CATALYTIC CONVERTER

CROSS REFERENCE TO RELATED APPLICATIONS

This application is a U.S. national stage entry under 35 U.S.C. § 371 of International Application No. PCT/GB2020/050062 filed Jan. 13, 2020, entitled "CATALYTIC CONVERTER," which claims priority to, and the benefit of, Great Britain Patent Application Serial No. 1900482.9, filed on Jan. 14, 2019. Each of the foregoing applications are hereby incorporated by reference in their entirety (except for any subject matter disclaimers or disavowals, and except to the extent of any conflict with the disclosure of the present application, in which case the disclosure of the present application shall control).

The invention relates to a catalytic converter comprising a material of olivine composition, and to methods and uses of the material in the reduction of nitrogen oxides (NOx) and/or oxidation of CO.

Catalytic converters have, until now, primarily been used in the processing of vehicle exhaust emissions to reduce their adverse impact on air quality. A particular focus has been on NOx and carbon monoxide (CO).

Air pollution from engine exhaust emissions contribute to tens of thousands of deaths per year in the EU alone [EEA, 2017; Hoek et al., 2002]. Current technologies designed to alleviate this involve catalytic conversion of exhaust pollutants, typically using Platinum Group Metals (PGMs) dosed onto alumina based substrates [Kašpar et al., 2003]. These materials are able to catalyse the oxidation of CO by oxygen ($O_2$), a relatively mature technology with a light-off temperature (at which 50% of the target species is converted) >150° C. However reduction of NOR, either by reaction with reductants already contained in the exhaust stream or with addition of a reducing agent such as urea, has proven to be more challenging. Recent scandals involving manufacturers of diesel vehicles, in particular, have shown that almost no diesel vehicles on the road meet emissions standards [Ntziachristos et al., 2016].

Materials capable of catalysing the reduction of NOR specifically over the abundant $O_2$ in exhaust streams are termed Selective Catalytic Reduction (SCR) materials, with vanadia, ceria and copper oxide leading industry technologies. Zeolite based SCR materials have been developed with significant activity at temperatures as low as 150° C. [Zhang and Yang, 2017].

Fe based catalysts, though known to be active as catalysts for CO oxidation, have been ruled out as engine exhaust catalysts because the formation of sulfides from the sulfur in fuels tends to deactivate the surface sites of the material, reducing longevity. However, moves to Ultra-Low Sulfur (ULS) fuels, in order to reduce $SO_2$ emissions, offer the chance to re-examine the potential of these lower cost catalytic materials. The mechanism of action of Fe based catalysts is complex, but previous studies have found that a useful model for the mechanism is as follows [Long and Yang, 2002]:

$$NO + \tfrac{1}{2}O_2 \rightarrow NO_2 \quad \text{R1}$$

$$NO_2 + 2NH_4^+ \rightarrow NO + 2NH_2 + H_2O + 2H^+ \quad \text{R2}$$

$$NO + NH_2 \rightarrow N_2 + H_2O \quad \text{R3}$$

The combination of R2 and R3 has an overall stoichiometry of:

$$NO + NO_2 + 2NH_3 \rightarrow 2N_2 + 3H_2O$$

$NH_2$ is a highly reactive species, so R2 was found to be the rate determining step in the presence of $NO_2$. However, diesel engines tend to produce less $NO_2$ at higher temperatures, so the rate of reduction is often limited by the production of $NO_2$ by R1. In that case the overall stoichiometry becomes:

$$4NO + 4NH_3 + O_2 \rightarrow 4N_2 + 6H_2O$$

A synthetic amorphous material of olivine composition ($Mg_xFe_{2-x}SiO_4$), designed as an analogue for meteoric material in Venus' atmosphere, was recently found to be an active catalyst for CO oxidation, with active site densities correlating to the Fe concentration [Frankland et al., 2017].

In the field of catalytic conversion of engine exhaust gases, the technologies for oxidation of CO are relatively mature, however, new materials capable of catalysing the reduction of $NO_x$ are needed in order to meet emissions targets. Further, it would be advantageous to provide low cost alternatives to the PGM materials currently in use for a range of engine applications, including stationary, off road and road vehicle engines.

The invention is intended to overcome or ameliorate at least some aspects of these problems.

Accordingly, in a first aspect of the invention, there is provided a catalytic converter including a catalyst, the catalyst comprising a material of olivine composition. Materials of olivine composition have been found to effectively reduce $NO_x$ to nitrogen, and in the presence of carbon monoxide to also oxidise carbon monoxide to carbon dioxide, making the material an excellent substrate for the catalytic conversion of these compounds in engine exhaust systems. In addition, olivine materials are inexpensive, and easy to manufacture, relative to PGM catalysts.

Without being bound by theory, it is believed that in the catalyst of the invention the silicate provides an active catalytic site in addition to the metal components of the material of olivine composition.

As used herein, the term "material of olivine composition" is intended to refer to a material of chemical composition comparable to olivine, but not necessarily of the same physical or crystalline composition. In this regard, the chemical composition refers to the bulk chemical composition, allowing for defects or deviations from the classical olivine chemical composition to be present in regions of the physical structure. It could therefore be said that at least 75 wt %, often 85 wt %, 90 or 95 wt %, or 99 wt % of the chemical composition of the catalyst have a bulk chemical composition of olivine composition. With regard to the physical structure of the catalyst ("the material"), this may differ from a sample of olivine rock in that it may be a finely powdered material, as opposed to an unprocessed sample of olivine rock. Providing a finely powdered material increases the surface area of the catalyst exposed to the reactants, maximising catalytic activity per gram of catalyst. Similarly, the powdered material may comprise particles with a rough surface, further enlarging the surface area of material (and so catalyst) available for catalytic activity. Further, it will often be the case that the material of olivine composition, as used in the invention, is not fully crystalline, as is often the case with natural olivine materials. Further, it is known that, at high loadings of iron, typical olivine materials will form crystalline phases. However, the material of the invention retains amorphous phases regardless of the precise ratio of the components therein. In addition, often the material will be synthetic as opposed to being directly derived from natural olivine. Further, it may therefore be the case that the any crystalline regions present in the material of the invention comprise iron silicate (e.g. fayalite). Additionally or alternatively, the material may comprise defect regions of crystalline iron oxide (e.g. hematite) and/or regions of iron oxide-hydroxide (e.g. goethite). However, where iron levels are low, the material includes a high percentage (by volume) in the form of amorphous regions, with relatively little crystalline content. Without being bound by theory, it is believed that some the iron containing crystalline phases may be supported by a silicate amorphous phase, in which iron is either absent or present at a low level (such as less than 5 wt %, or less than 1 wt %). It could therefore be said that the material comprises a combination of crystalline and amorphous regions. Often, the crystalline regions will comprise iron-containing compounds, wherein the iron-containing compounds may be selected from iron silicate, iron oxide, iron oxide-hydroxide and combinations thereof.

Often the particle mobility radius will be in the range 150-500 nm, often 200-400 nm or 250-350 nm, and the specific surface area will be in the range 200-300 $m^2g^{-1}$, often 225-275 $m^2g^{-1}$ or around 250 $m^2g^{-1}$ Since this surface area suggests a surface equivalent spherical radius of <10 nm, the material is known to be significantly rough.

The terms "NOx" or "nitrogen oxides" are intended to refer to nitrogen monoxide (NO), nitrogen dioxide ($NO_2$), or combinations thereof. Typically, NOx will comprise a mixture of NO and $NO_2$, although NO will usually be present at higher levels than $NO_2$, partly because $NO_2$ is formed from NO, and partly because $NO_2$ is significantly more reactive than NO.

Often the material of olivine composition will be selected from compositions with the following bulk chemical compositions: forsterite ($Mg_2SiO_4$), fayalite ($Fe_2SiO_4$), monticellite ($CaMgSiO_4$), kirschsteinite ($CaFeSiO_4$), tephroite ($Mn_2SiO_4$) and combinations or blends thereof, with or without defect regions in the physical structure. Often the material will be selected from forsterite and/or fayalite, most often, the material will be of formula $Mg_xFe_{2-x}SiO_4$ wherein x is in the range 0-2.0, often x will be in the range 0.1-2.0 or 0.2-1.5, often 0.3-1.0 or 0.5-0.8 such that there will be a fayalite component. The greater the fayalite:forsterite ratio, the greater may be the crystallinity present.

Generally, the material of the invention will be of density in the range 2.5-8 $g\ cm^{-3}$, often in the range 2.6-3.3 $g\ cm^{-3}$ this provides a good balance between surface area and structural robustness at the operating temperatures of the catalytic converter.

It may be that the catalytic converter further comprises a reductant, often selected from ammonia or a source of ammonia such as urea. Often, the reductant will comprise ammonia. The presence of the reductant facilitates the reduction of NOx at low temperatures, allowing for the provision of "cold start" catalytic converters. This is important as current standard catalytic converters only operate efficiently at high temperature (of the order greater than 200° C.). The heating of the catalytic converter to these temperatures is typically achieved through heating of the converter by the hot exhaust gases produced by the engine, however, such temperatures are only achieved after the engine has been running for several minutes and during this time unconverted exhaust gases (e.g. NOx and CO) are released into the atmosphere. It is therefore highly desirable to provide a catalytic converter which can be operated at low temperature, and hence which will efficiently convert gases from engine start. A further problem is the cooling of the engine when it is idle, such as in slow moving or stationary traffic, in such circumstances the catalytic converter cools, and catalytic activity is reduced, or the converter ceases to operate. As stationary traffic is generally found in highly populous areas, it would be extremely advantageous to reduce the emissions in such "traffic jam" situations, by providing a catalytic converter which continues to operate when the engine is idle.

In other aspects, the construction of the catalytic converter is envisaged as being conventional, allowing for simple adaption ("retrofit") of existing systems to include the material of olivine composition.

In a second aspect of the invention, there is provided an engine comprising a catalytic converter of the first aspect of the invention. The NOx, and/or carbon monoxide may be from any system generating these gases as waste gases. Alternatively, the production of NOx or carbon monoxide may be intentional as chemical intermediates in a wider process. However, it will often be the case that the NOx and/or carbon monoxide will be waste gases, and very often from an engine exhaust gas stream. As a result, the catalytic converter will often form part of an engine. Often, due to the high levels of NOx produced by such engines, the engine will be a diesel engine.

Often the engine will be an off-road engine, such as an engine for power generation, as currently such engines rarely include exhaust gas after-treatment systems for cost reasons. This lack of exhaust gas conversion can lead to poor air quality in the vicinity of the engine, and damage to human health. The static engine may form part of a relatively small system, where the exhaust gas produced is directly fed into the catalytic converter, or part of a larger system where the exhaust gas is transported through conduits to the converter. In these latter systems, the exhaust gas inevitably cools during transport, such that in existing "large" systems it must be reheated prior to passing over the catalytic converter to ensure catalytic activity and conversion. A benefit of the catalytic converter of the invention is that, as it operates at low temperature, such reheating is not always required.

The engine may also be a vehicle engine such as a locomotive engine, automobile engine, heavy goods vehicle engine, marine vehicle engine, farm vehicle engine and/or construction vehicle engine. The high density of such vehicles, in particular in urban areas, can lead to a dramatic reduction in local air quality, and as such the presence of a catalytic converter is seen as vital to mitigating the effects of the release of gases that would be toxic to humans and animals if not otherwise processed.

Further, both urban areas and the environments around static engines often have high ozone concentrations, which are in part caused by localised NOx emissions reacting with volatile organic compounds in the presence of sunlight. In the presence of the catalyst, the NOx is further converted to the benign compound $N_2$, and so the catalyst may also play a role in reducing localised ozone build up.

In a third aspect of the invention, there is provided a method of producing nitrogen from NOx comprising the catalytic reduction of NOx by a material of olivine composition. Often the material will be present as a heterogeneous catalyst. Often, the reduction of NOx is in the presence of a reductant, such as ammonia or urea, for the reasons described above.

Often the reduction of NOx can be at room temperature, often at a temperature in the range 0-30° C., often in the range 10-25° C., or 15-20° C. As discussed above, the ability to efficiently reduce NOx prior to heating of the catalyst ensures that release of NOx into the atmosphere is minimised during the heating of the catalyst to operating temperatures. However, the most efficient operating temperature for the catalyst will often be in the range 150-300° C., often in the range 175-250° C. as at these temperatures the activation energy for the reduction or oxidation reactions is readily supplied by the heat energy.

It is an advantage of the invention that where carbon monoxide is present, the catalyst can oxidise carbon monoxide to carbon dioxide, such that the catalyst may be used for the oxidation of carbon monoxide in the absence of NOx. However, such oxidation is typically simultaneous with the reduction of NOx, due to the mixed nature of the exhaust gases passing over the olivine catalyst. However, it is possible that the exhaust gases could be pre-separated and fed over the catalyst sequentially, or fed over different catalyst monoliths. This provides for a two-way catalytic converter using only a single catalyst substance, reducing the cost and complexity of manufacture.

In a fourth aspect of the invention there is provided the use of a material of olivine composition in the catalytic reduction of NOx. As mentioned above, often the NOx reduction is in the presence of a reductant, although the reductant may also be absent. Further, often reduction will commence at room temperature, or be primarily at room temperature. Further, the use may be in the catalytic reduction of NOx and oxidation of carbon monoxide. In some cases, reduction and oxidation are substantially simultaneous. Often the use is in the reduction of NOx from an engine exhaust gas, often from a diesel engine. As described above, the engine will often be a stationary engine, although vehicle engines may also benefit from the use.

In a fifth aspect of the invention there is provided a method of manufacture of a catalytic converter according to the first aspect of the invention, the method comprising adding the catalyst to a wash coat, applying the catalyst-containing wash coat to a substrate, optionally washing to remove by-products before annealing the coated substrate. Often the substrate is stainless steel and/or a ceramic material. Often the substrate is a catalyst monolith.

In one aspect there is provided a catalytic converter comprising a material of the formula $Mg_xFe_{2-x}SiO_4$ wherein x is in the range 0.1-2.0 and a reductant, the reductant comprising ammonia. There is also provided an engine comprising this catalytic converter. The engine is often a diesel engine and is generally either a static engine or a vehicle engine.

In an aspect, there is provided a method of producing nitrogen from NOx comprising the catalytic reduction of NOx and oxidation of carbon monoxide from an engine exhaust gas stream by a material of olivine composition in the presence of reductant at room temperature. Additionally or alternatively, there is provided the room temperature use of the material and a reductant in the catalytic reduction of NOx from a static or vehicle diesel engine exhaust gas.

Unless otherwise stated, each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

In order that the invention may be more readily understood, it will be described further with reference to the figures and to the specific examples hereinafter.

FIG. 1 is a schematic diagram of the test apparatus (V—2 or 3-way valve, P=pressure transducer, K=K type thermocouple feedthrough, R=rotary pump, T=turbo pump);

FIG. 2 is a mechanistic model of the reduction of NO and $NO_2$ to $N_2$ using the catalyst, based upon electronic structure calculations. ΔH is the reaction enthalpy (at 0 K) in kJ mol$^{-1}$ (Fe (violet); O (red); Si (grey); H (white); N (purple));

FIG. 3 shows mass spectrometer signals of species in a gas flow in contact with the catalyst, relative to the signals in an empty but otherwise identical reference flow tube. Shaded grey areas indicate when the flow was passed through the reference tube. A 10% composition of $H_2$ (5 sccm) in argon was introduced into the system with pressure in the sample flow tube of 7.1 torr. FIG. 3(a) shows the relative signals for $H_2$ and $H_2O$ and FIG. 3(b) the absolute loss of $H_2$ as the temperature is increased;

Figure 6:
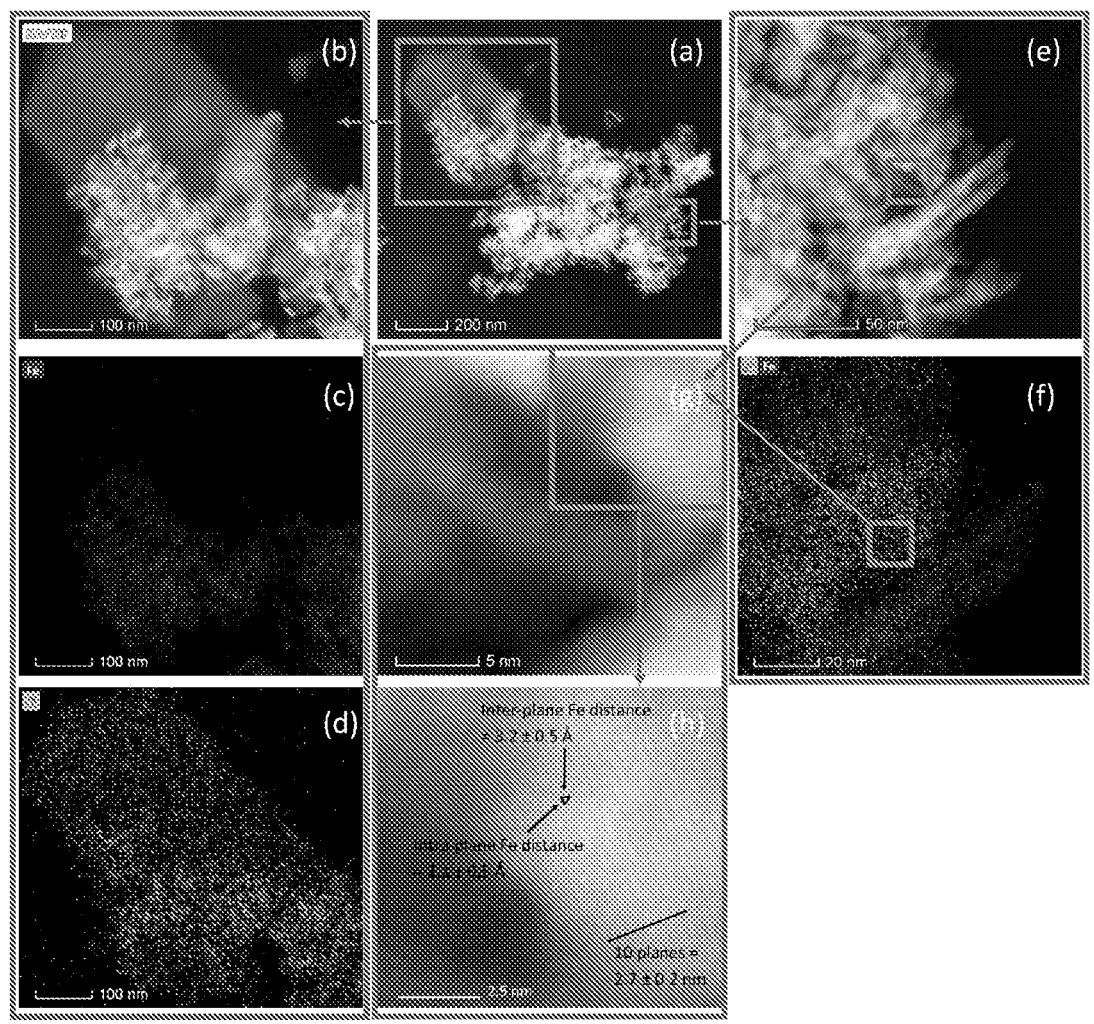
Figure 7:
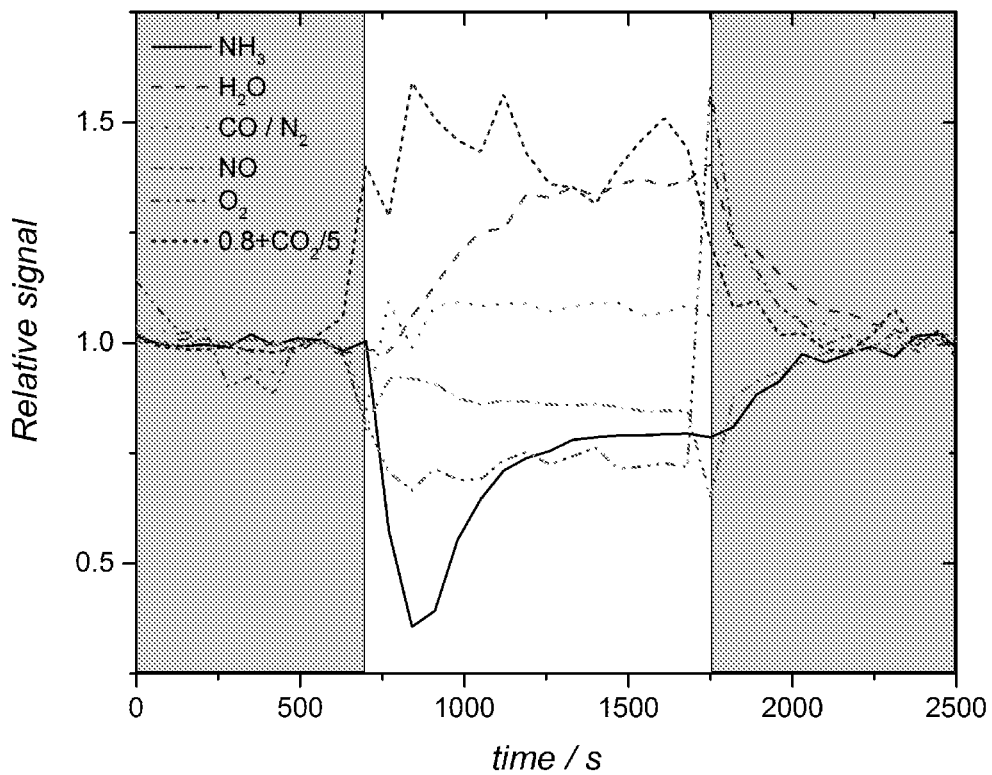
Figure 8:
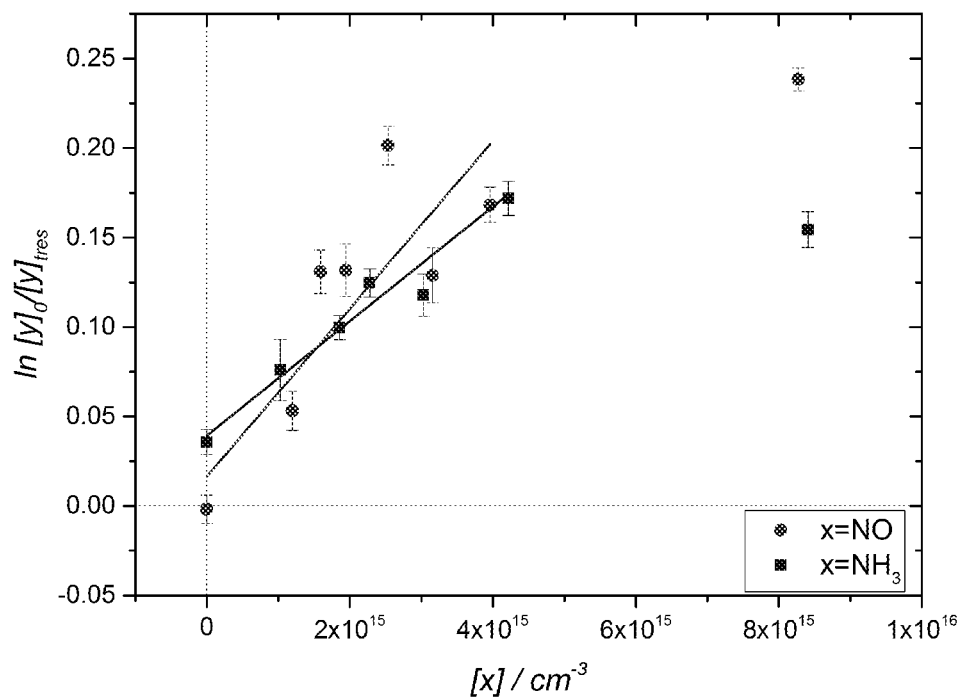
Figure 9:
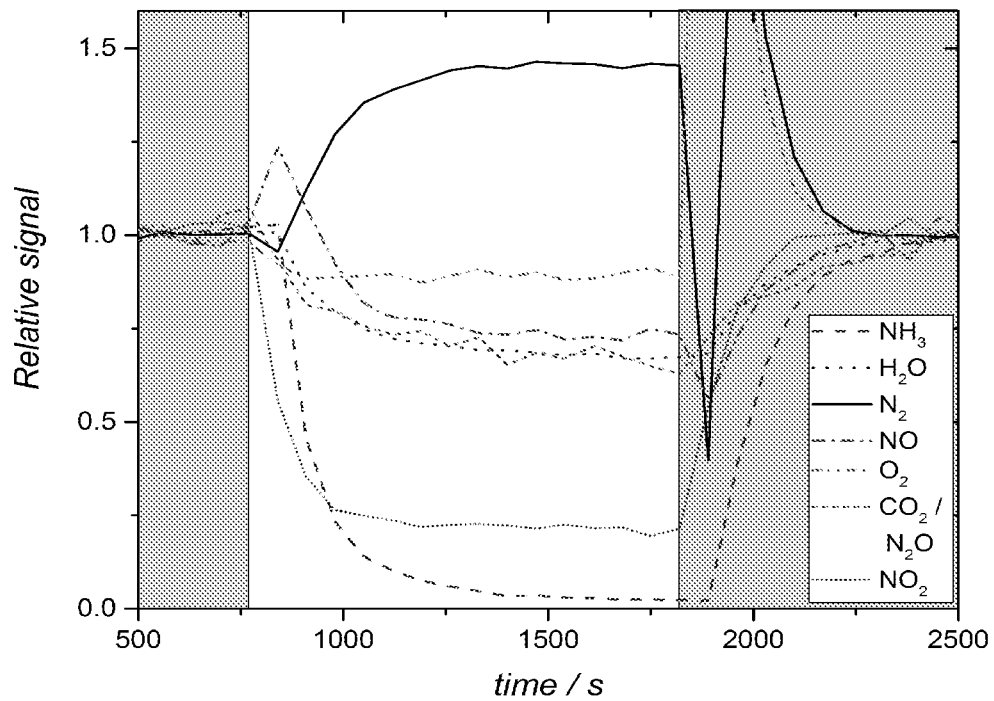
Figure 10:
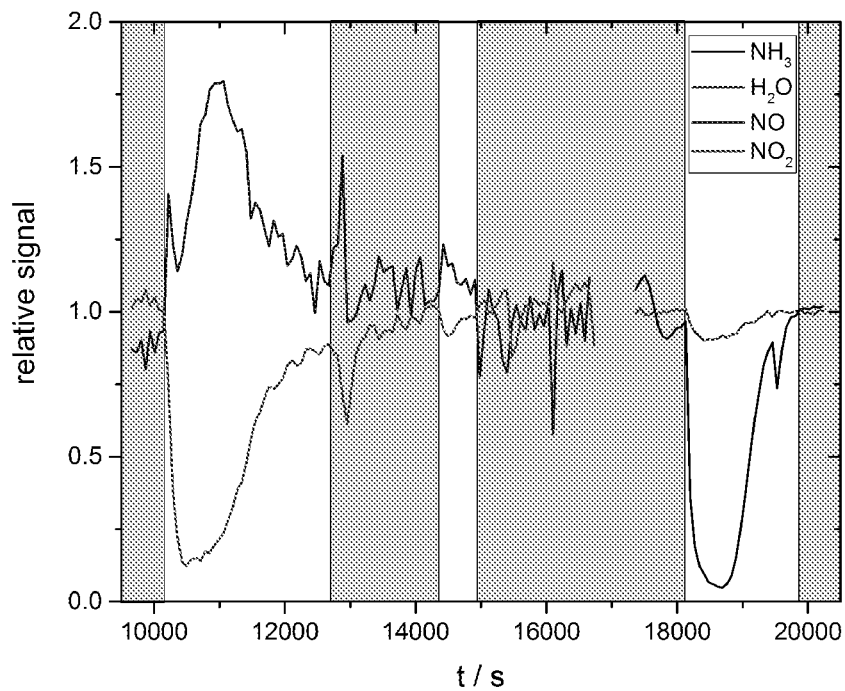
Figure 11:
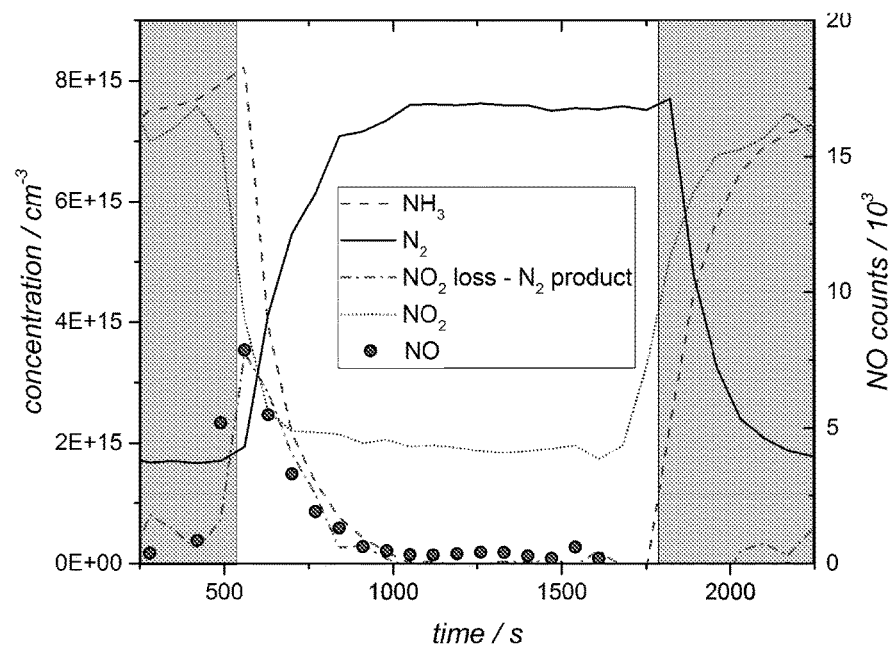
Figure 12:
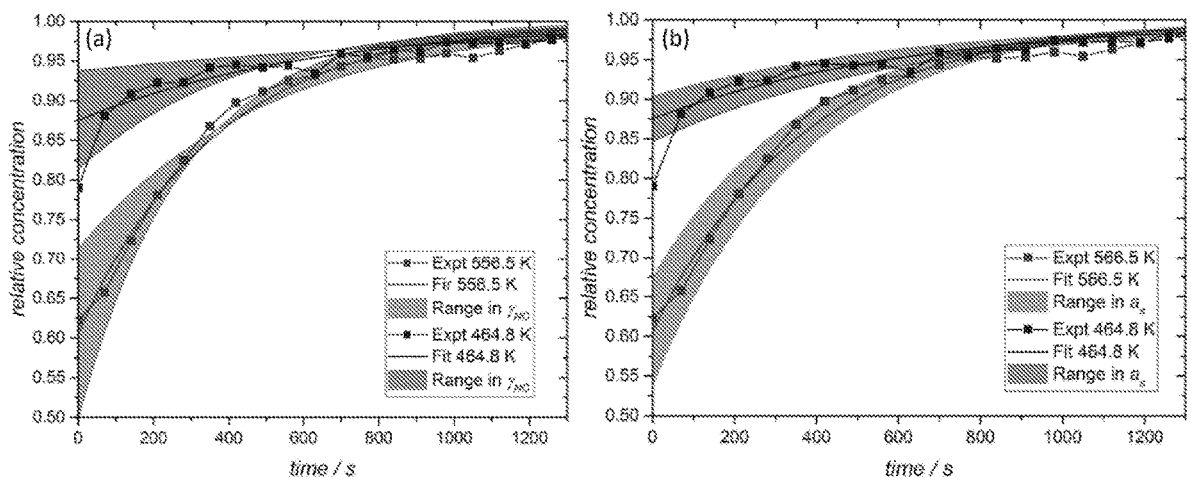
Figure 13:
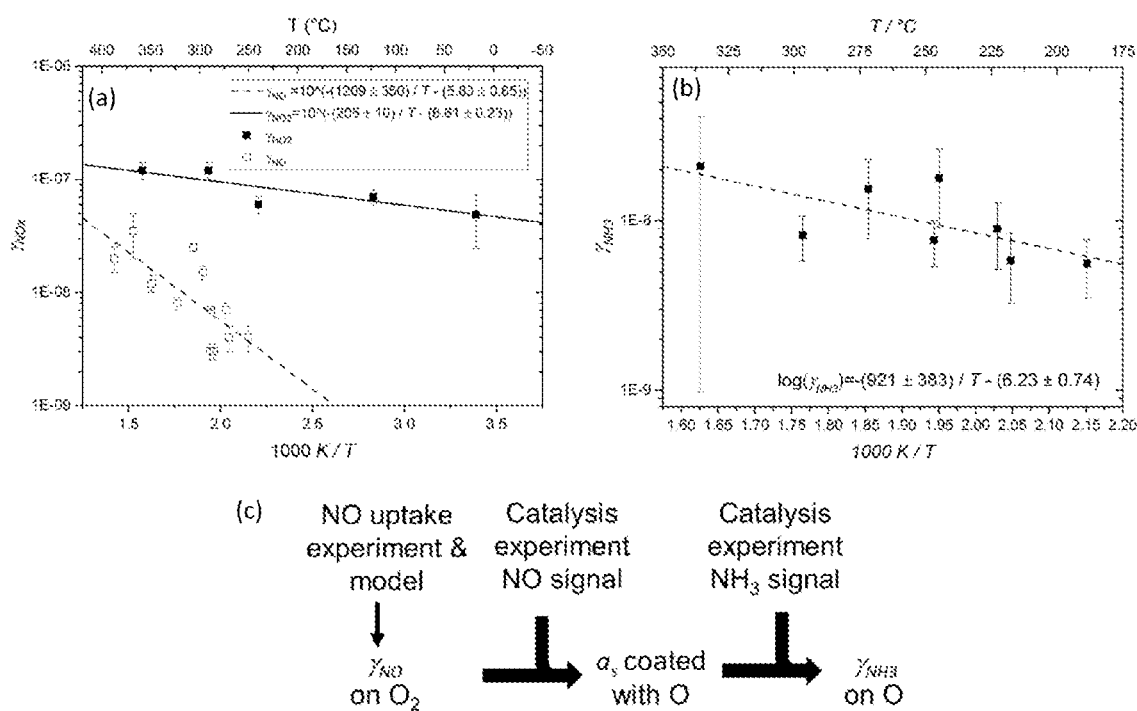
Figure 14:
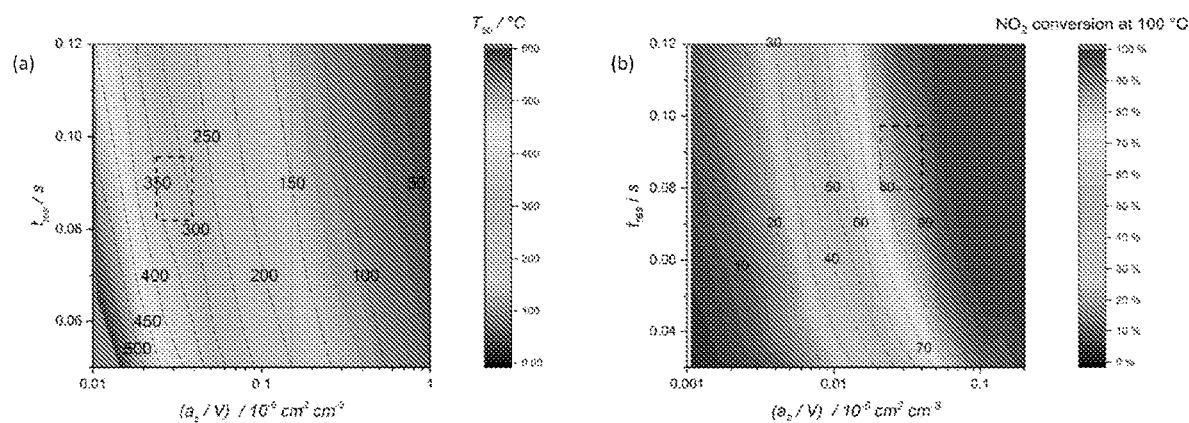
Figure 15:
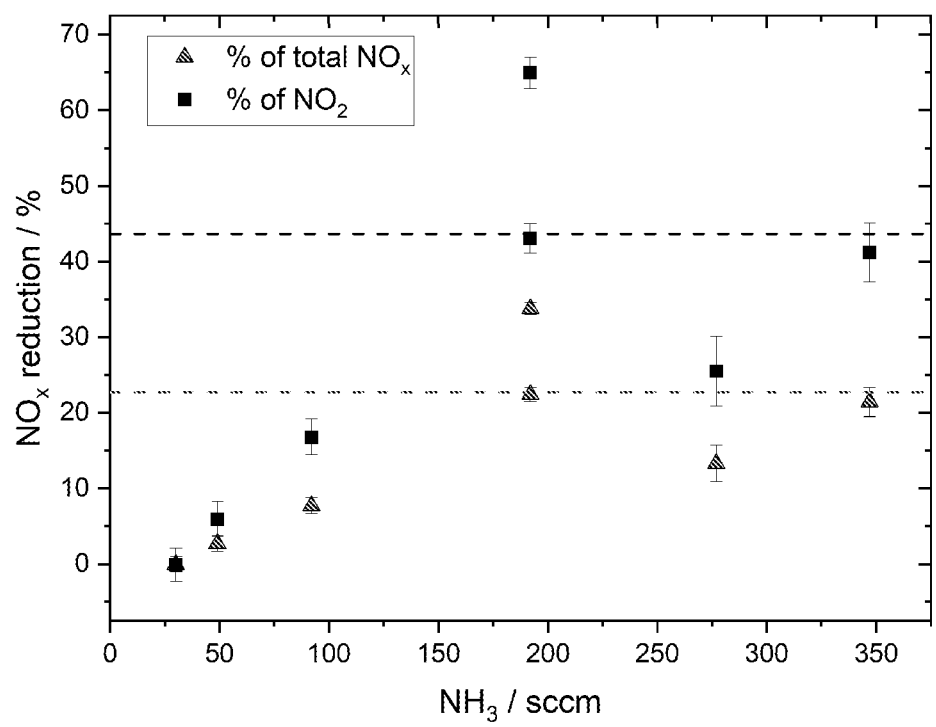
Figure 16:
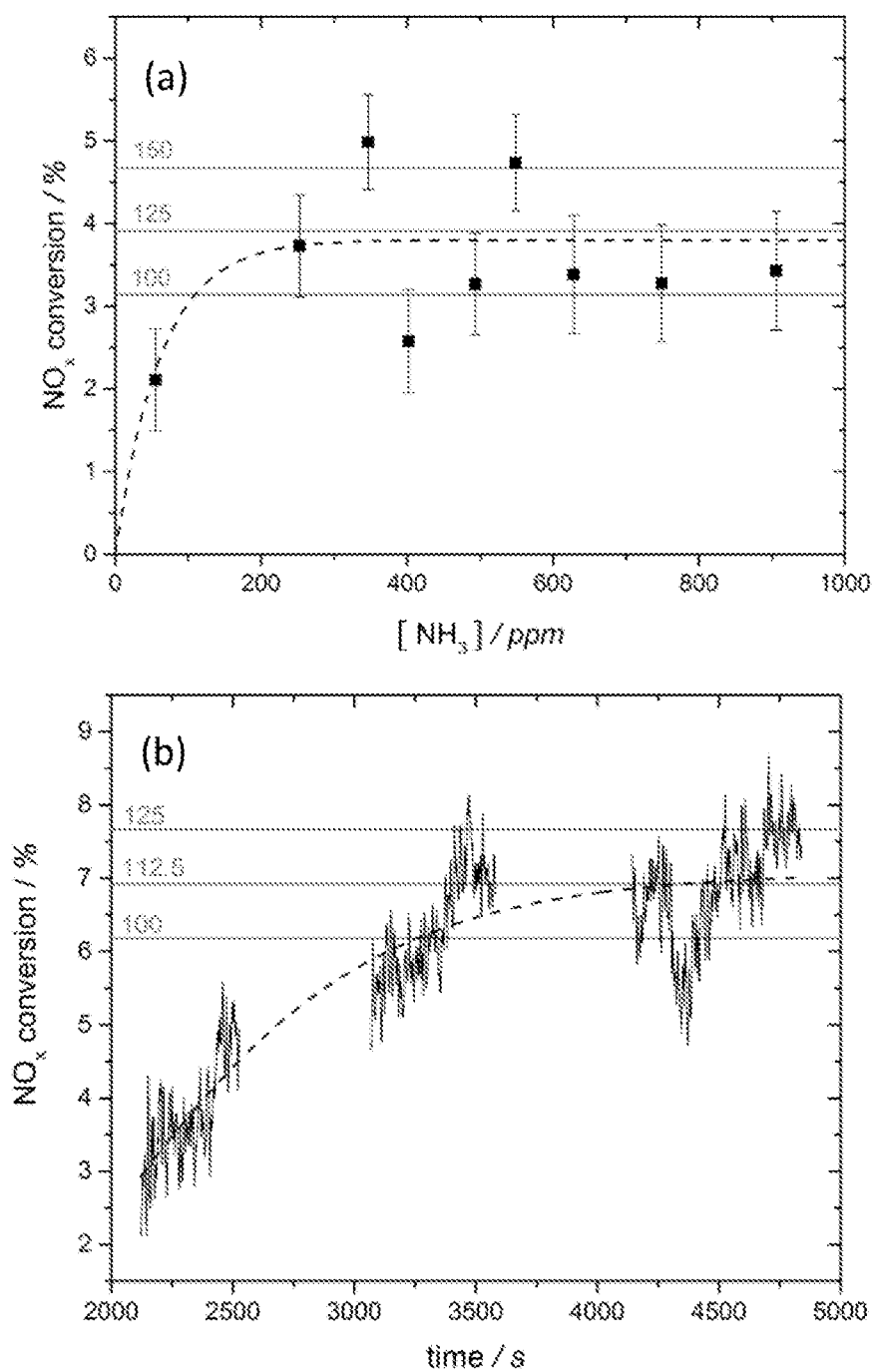

FIG. 6 shows co-located TEM images of a LowCat particle. Panel (a) shows a TEM bright field image of an example particle of LowCat after activation. Panels (b) and (e) show sub regions of that particle as indicated by blue boxes. Panels (c) and (d) show EDX maps of the Fe and Si content, respectively, of the region shown in (b). Panel (f) shows overlaid Fe and Si content of the region shown in (e). Panels (g) and (h) show a nested region within (e) in which the material to the left shows only Si content and the upper right corner shows both Si and Fe content, at sufficient resolution to distinguish atomic and inter-planar distances;

FIG. 7 shows mass spectrometer signals of species in a gas flow in contact with the catalyst, relative to the signals in an empty but otherwise identical reference flow tube. Shaded grey areas indicate when the flow was passed through the reference tube. In this figure, the simultaneous oxidation of CO and reduction of NO using the catalyst is shown (experimental conditions: 241.4° C., 10% mixtures of NO and $NH_3$ (each 3 sccm)) and a 2.5% 02, 14% CO mixture (total pressure of 10.9 torr) all in He, using the apparatus of FIG. 1;

FIG. 8 shows the kinetic order of the rate determining step where NO (red circles) or $NH_3$ (blue squares) are rate limiting;

FIG. 9 shows mass spectrometer signals of species in a gas flow in contact with the catalyst, relative to the signals in an empty but otherwise identical reference flow tube. Shaded grey areas indicate when the flow was passed through the reference tube. 10% mixtures of $NO_2$ and $NH_3$ (each 1 sccm) in He were introduced into the system and signals measured at room temperature (19.5±0.5° C.), with a pressure in the sample flow tube of 6.9 torr;

FIG. 10 shows mass spectrometer signals of species in a gas flow in contact with the catalyst, relative to the signals in an empty but otherwise identical reference flow tube. Shaded grey areas indicate when the flow was passed through the reference tube. A 4.5% composition of $NO_2$ (1 SCCM) in helium was introduced into the system at t=0 and signals measured at room temperature (24° C.+0.5° C.), with a pressure and sample flow tube of 1.87 torr. At t=17,000 seconds the $NO_2$ composition was exchanged for a 4.5% composition of $NH_3$ (1 sccm);

FIG. 11 shows the loss of $NO_2$ and $NH_3$ and production of $N_2$ in a catalysis experiment at 229.2° C., based on m/z 46, 17 (corrected for $OH^+$ formed from fragmentation of $H_2O^+$) and 28 signals respectively. Also shown is the difference between the $NO_2$ loss and $N_2$ production, and the NO signal (points, right axis, based on the m/z 30 signal after correction for $NO_2^+$ fragmentation). Experimental conditions: 10% mixtures of $NO_2$ and $NH_3$ (each 3 sccm) in He were introduced into the system with a pressure in the sample flow tube of 7.7 torr;

FIG. 12 shows the uptake of NO onto the catalyst at two temperatures (556.5K and 464.8K). Points show experimental data, shaded areas show the modelled concentration, (a) illustrates the sensitivity of the model to γ; (b) illustrates the sensitivity to the available surface area;

FIG. 13 shows the temperature dependence of γ for the uptake on the catalyst of NO and $NO_2$ (a) and $NH_3$ (b). Panel (c) shows a schematic representation of the data analysis process used to obtain these values from NO uptake and catalysis experiments. The error bars shown in (a) are taken from reasonable ranges of the kinetic model fit (see FIG. 8) with an additional 20% to account for further uncertainties in the model parameters; the error bars in (a) and (b) are then propagated from these. Fits to the measured data are also shown;

FIG. 14(a) shows the predicted $T_{50}$ values (at which half of NO would be reduced) for a generic engine exhaust in contact with an emissions modification system including the catalyst, the calculations are based on known volumetric surface area ($a_s$ cm$^3$/V cm$^2$) for a known residence time ($t_{res}$). FIG. 14(b) shows the predicted conversion for $NO_2$ by representing the amount $NO_2$ converted at 100° C. (the approximate stable temperature of the exhaust when an engine runs under idle load). In each case, the horizontal axis shows the amount of catalyst present in the exhaust flow, and dashed boxes are used to indicate the range of conditions that can be obtained with the engine apparatus used;

FIG. 15 shows the conversion of $NO_2$ at 90° C. (idle engine load) in preliminary engine trials with varying $NH_3$ injection. The same data is shown twice. In black squares the loss of $NO_2$ is considered as a fraction of the total $NO_2$ (dashed line 44%) and in green triangles as a function of total NOx (dashed line at 23%). The accuracy of some figures is such that the error bars are not visible on the graph as they are smaller than the plot points used; and FIG. 16 shows a comparison of modelled and experimental observations for $NO_x$ conversions. FIG. 16(a) shows the performance of a catalyst coated monolith prototype in engine trials as a function of available $NH_3$. FIG. 16(b) shows the performance of two catalyst coated monolith prototypes placed together in the exhaust flow, one being freshly coated and one previously used over time in 300 ppm $NH_3$. In both figures (a) and (b), the engine was operated at 3 kw load with red diesel fuel, giving exhaust temperatures of 520±5K, 300±20 ppm NO and negligibly low $NO_2$. Grey lines and numbers indicate modelled $NO_x$ conversion assuming that the geometric surface area multiplied by the factor shown was available under these exhaust conditions.

Figure 1:
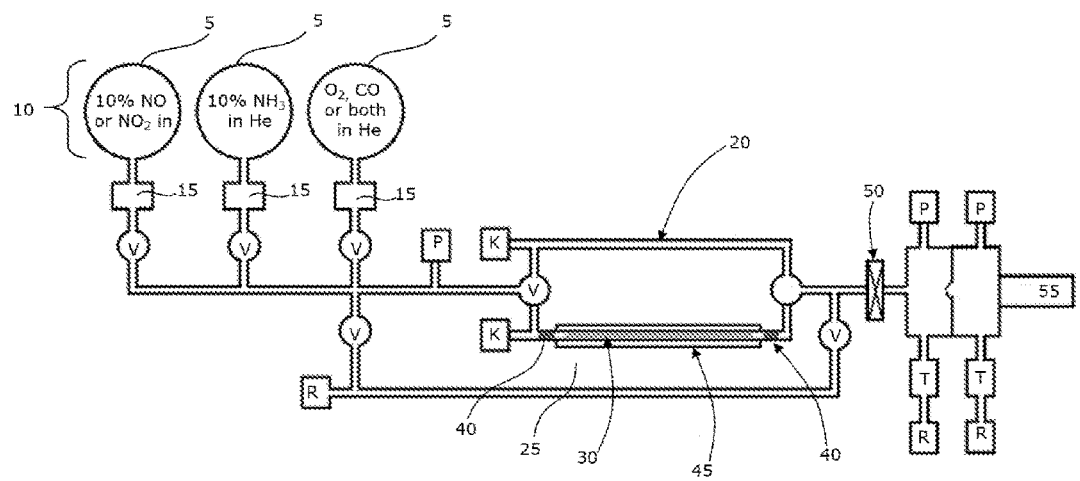

FIG. 1 shows the test apparatus of the invention. NO (>99%, BOC), $NO_2$ (99.5% BDH chemicals) and $NH_3$ (micrographic grade, BOC) were purified by repeated freeze-pump-thaw, then diluted to 10% volume mixing ratio in Helium. $O_2$ (zero grade—BOC) and CO (99.5%, Argo international) were diluted to a range of concentrations in helium without purification. The gas mixtures 5 were released from storage vessels 10 through mass flow controller 15 (controlled by valves V), and directed either through a blank quartz flow tube 20 (internal radius 5 mm, length 30 cm) or through an identical tube 25 containing a finely powdered sample of the catalyst 30. The flow tube 35 comprises glass wool 40 at entry and exit apertures and insulated heating tape 45. After passing through gate valve 50, the chemical composition of the flow was measured using a quadrupole mass spectrometer 55 (SXP-Elite). The system was operated at pressures in the range 0.5-11 torr, with typical flow rates <5 sccm, so that the uptake of reactants was not limited by gas phase diffusion.

EXAMPLES

Experimental

Synthesis and characterisation of the $Mg_xFe_{2-x}SiO_4$ material has been carried out and reported previously [James et al., 2017]. In this study 0.3 g was placed in one channel of a dual flow tube apparatus [Frankland et al., 2016], shown in FIG. 1. In this work two kinds of experiments were carried out: uptake and catalysis. In uptake experiments a single target species was diluted in a He bath gas. This mixture was then passed first through the reference (or blank) flow tube to establish a baseline signal, then exposed to the catalyst to observe the loss of gas to the surface; then, after a stable signal had been measured for around 5 minutes, returned to the blank flow tube to allow correction for any drift in the background sensitivity of the QMS. In catalysis experiments a mixture of gases designed to probe processes which might occur in engine exhaust was added to the system, in the same blank/sample/blank order.

To examine the behaviour of the uptake and catalysis processes with temperature, the catalyst flow tube was heated by means of a heating tape to a maximum temperature of approximately 400° C., measured by K-type thermocouples. In some catalysis experiments the ratio of reactants was varied to determine the dependence of the reaction rate on the concentration of each reactant.

Modelling

Mechanism

In order to understand the kinetic measurements of the reduction of $NO_x$ in the presence of $NH_3$ as a reductant on the catalyst, electronic structure calculations were completed using the Gaussian 16 suite of programs [Frisch et al., 2016]. The hybrid density functional/Hartree-Fock B3LYP method was used together with the 6-311+G(2d,p) triple zeta basis set. This is a reasonably large, flexible basis set with both polarization and diffuse functions added to the atoms, which have been used previously for calculations on Fe-containing oxides, hydroxides and silicates. The expected uncertainty in the calculated reaction enthalpies should be ±30 kJ mol$^{-1}$ at this level of theory.

Figure 2:
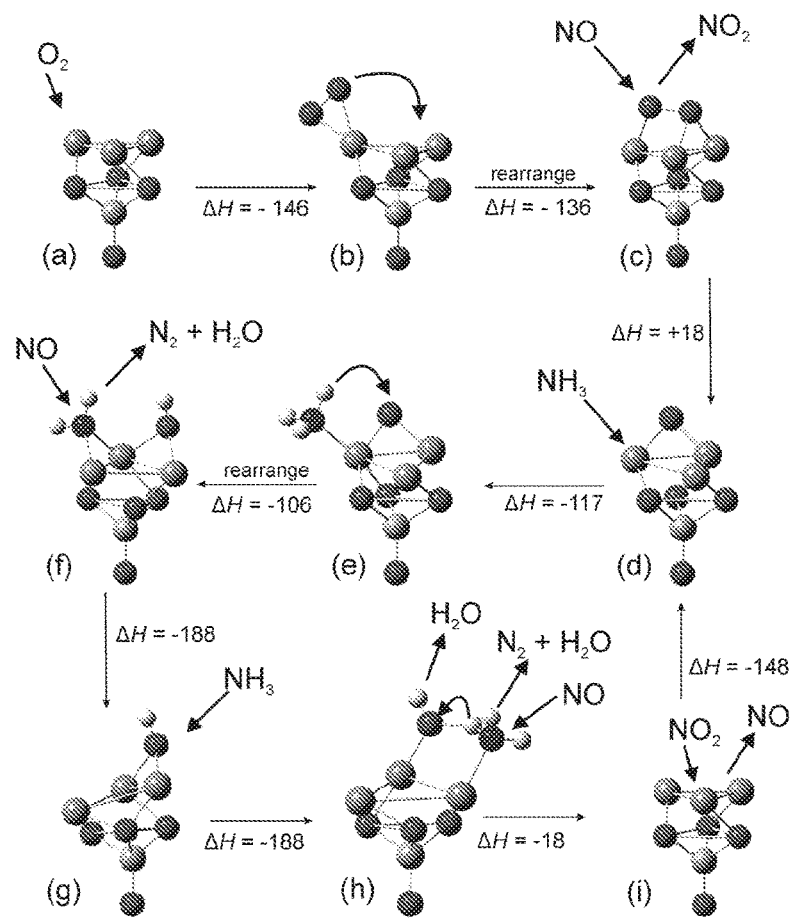

Three Fe atoms bound to a $SiO_4$ tetrahedron were used to approximate the catalyst surface, as shown in FIG. 2(a). The distance between the Fe atoms exposed at this model surface is 2.6 Å. While this is clearly an approximation of the surface, it yields insights into the likely NOx mechanism and is a useful comparison with the experimental observations. For each molecular structure in FIG. 2, the geometry was first optimised and then vibrational frequencies calculated to determine the zero point energy correction.

FIG. 2 shows a sequence of reactions which can produce $N_2$ and $H_2O$ from $NO_x$ and $NH_3$ with no significant energetic barriers and with all but one step being exothermic. The species which binds most strongly to the surface is $O_2$, particularly as the adsorbed $O_2$ (FIG. 2(b)) can stretch to bind to all three Fe atoms on the surface (FIG. 2(c)), gaining an additional 136 kJ mol$^{-1}$. The total binding energy of $O_2$ is then 282 kJ mol$^{-1}$, which means that $O_2$ can displace other species such as $NH_3$. Adsorbed $O_2$ plays a crucial role in the mechanism, because gas-phase NO can react with it to leave an adsorbed O on the surface (FIG. 2(d)), in a reaction that is thermoneutral (within error). $NH_3$ can then adsorb on an adjacent surface Fe (FIG. 2(e)), before an H atom transfer to the O (FIG. 2(f)). The resulting adsorbed $NH_2$ group can then react with NO to yield $N_2+H_2O$, in a highly exothermic reaction (FIGS. 2(f)→(g)). It is known that the reaction between the gas-phase $NH_2$ radical and NO is fast with a negative temperature dependence, and in this model it is assumed that the reaction with surface-adsorbed $NH_2$ is also efficient. A second $NH_3$ can then adsorb onto a surface Fe adjacent to the remaining adsorbed OH, enabling an HO—HNH$_2$ hydrogen bond to form (FIG. 2(h)). When an NO attacks the $NH_3$, the H atom can transfer to the OH to form an adsorbed $H_2O$, while $N_2$ and a second $H_2O$ are released into the gas phase. Alternatively, the first $H_2O$ could desorb directly in this step, giving an overall reaction that is slightly exothermic. However, even without direct desorption, this $H_2O$ is bound to the surface by only 75 kJ mol$^{-1}$, so thermally desorption is quite rapid (e-folding lifetime on the surface ~20 µs at 473 K). This leaves a vacant surface site of 3 Fe atoms (FIG. 2(i)). Where present, a $NO_2$ molecule, can now adsorb dissociatively, releasing NO back to the gas phase and forming the intermediate in FIG. 2(d).

Whilst the mechanism proposed in FIG. 2 differs from the less detailed schemes presented previously, it is able to produce the same overall stoichiometry of reactions R1, R2 and R3, and also the so called "fast reduction process"; $NO+NO_2+2NH_3\rightarrow2N_2+3H_2O$.

The overall reaction sequence is described in Table 1.

Kinetics of loss of a species, x, to a surface is parameterised by the uptake coefficient, γ, as described in E1 [Saunders et al., 2012];

$$\frac{d[x]}{dt} = -\frac{\bar{c}}{4}\frac{a_s}{V}\gamma[x] \qquad \text{E1}$$

where $\bar{c}$ is the molecular mean speed of species x, $a_s$ is the area onto which the species is lost and V is the volume of the system. In the model, γ represents the probability that a collision of a gas phase molecule with the surface results in loss from the gas phase. This probability can be controlled by factors such as the preparation of the surface (e.g. coating with another reactant which occupies surface sites), the orientation of the colliding molecule, and the available energy. Since the situation is generally very complex, γ is typically measured as an empirical quantity across a range of temperature conditions.

Further Characterisation

Surface Redox Chemistry

To investigate the chemical nature of the catalyst material at a more fundamental level, the reduction and oxidation potential were probed using $H_2$ as reductant. The surface of a catalyst sample was saturated with $H_2$ and the total loss used to evaluate the density of active sites available for catalysis.

The sample was pre-treated by heating under Ar to 600 K and maintaining that temperature until $H_2O$ desorption was no longer observed. A 10% $H_2$/Ar mixture was then passed first through the blank flow tube before being introduced to the catalyst sample at room temperature (297K). The temperature was then increased (at 12 K min$^{-1}$) to a maximum temperature of 800 K, where it was maintained until $H_2$ consumption was no longer observed. The flow was then briefly redirected to the blank flow tube to allow correction for drift in QMS sensitivity.

Figure 3:
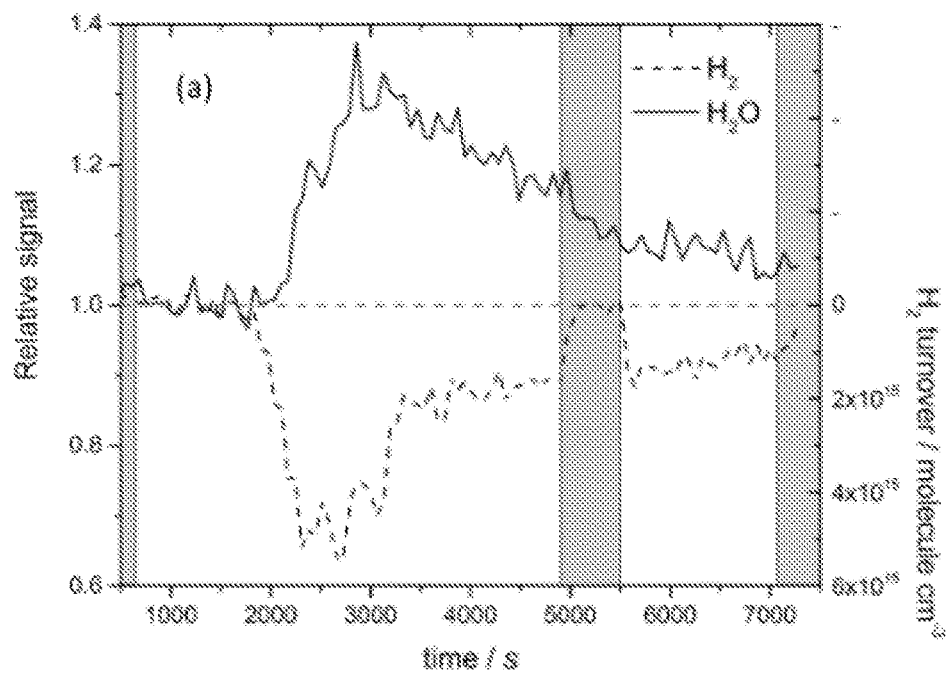
Figure 3:
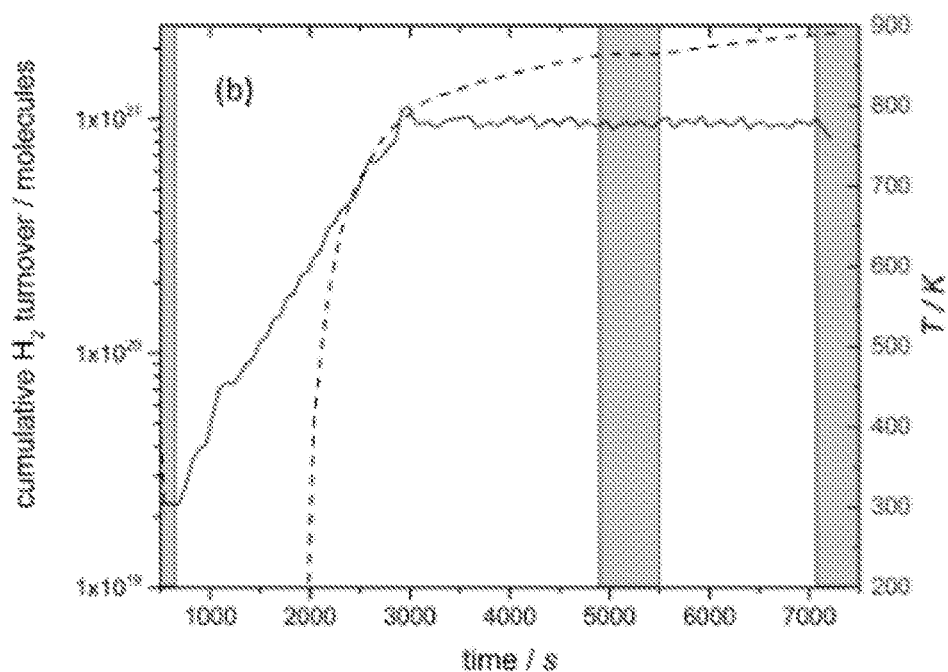

Results are shown in FIG. 3. $H_2$ was measurably consumed from 550 K, consumption peaked by 650 K, and over an hour at 800 K was required for $H_2$ consumption to reach completion. $H_2O$ desorption was observed after a slight delay. This suggests that either $H_2$ is able to displace chemisorbed $H_2O$, which was not removed by the pre-

TABLE 1

Reaction steps in the reduction of $NO_x$ by $NH_3$ on an idealised catalyst surface.

| Reaction | Structures in FIG. 2 |
|---|---|
| $Fe_3SiO_4 + O_2 \rightarrow Fe_3SiO_4$  O  O | (a) → (b) → (c) |
| $Fe_3SiO_4$—O  O + NO → $Fe_3SiO_4$  O + $NO_2$ | (c) → (d) |
| $Fe_3SiO_4$  O + $NH_3$ → $Fe_3SiO_4$  OH  $NH_2$ | (d) → (e) → (f) |
| $Fe_3SiO_4$  OH  $NH_2$ + NO → $Fe_3SiO_4$  OH + $N_2$ + $H_2O$ | (f) → (g) |
| $Fe_3SiO_4$  OH + $NH_3$ → $Fe_3SiO_4$  OH  $NH_3$ | (g) → (h) |
| $Fe_3SiO_4$  OH  $NH_3$ + NO → $Fe_3SiO_4$ + $N_2$ + 2$H_2O$ | (h) → (i) |
| $Fe_3SiO_4$ + $NO_2$ → $Fe_3SiO_4$  O + NO | (i) → (d) |
| $Fe_3SiO_4$  O + 2$NH_3$ + 2NO → $Fe_3SiO_4$ + 2$N_2$ + 3$H_2O$ | (d) → (e) → (f) → (g) → (h) → (i) |
| Overall: $O_2$ + 4NO + 4$NH_3$ → 4$N_2$ + 6$H_2O$ | |

As can be seen, this reaction eliminates NO, replacing it with the relatively benign materials $N_2$ and water.

The experimental results discussed below show a remarkable agreement with the detailed mechanism suggested by the theoretical work.

Calculation of Uptake Coefficient and Light-off Temperatures: Model E1 treatment of the sample, or that $H_2$ was reducing the surface, and $H_2O$ is a reaction product. Subsequent experiments with a 10% $O_2$/Ar mixture were not able to reverse this process.

The total amount of $H_2$ consumed was calculated by integrating the consumption in each measurement timestep. Comparing this to the amount of surface Fe (assuming a mean distance of 3.1 Å between surface Fe, and taking the BET surface area of 244±2 m$^2$, g$^{-1}$) a ratio of 0.91±0.13

H$_2$:Fe was obtained. This suggests that H$_2$ was able to reduce the entire surface as measured by BET analysis. The amount of H$_2$ removed is approximately equal to the Fe contained in the surface, which may suggest that the H$_2$O observed is a reaction product, alongside SiO$_2$ and metallic or oxide Fe.

This measurement of the density of surface sites allows the laboratory data to be reanalysed in terms of the turnover frequency of NO$_x$ and NH$_3$ in a given experiment. However as pre-treatment of the sample to give a reproducible available surface area is not practical in the engine trials, the uptake coefficient is preferable as a method of characterising the observed activity. The reasonability of the available surface area required to explain observed loss then becomes the test of the comparison between flow tube and engine experiments.

X-Ray Diffraction for Crystal Structure

Samples of catalyst powders as synthesised, after prolonged use in catalysis experiments and after treatment with H$_2$ were assessed for their crystal structure using X-Ray diffraction.

Figure 4:
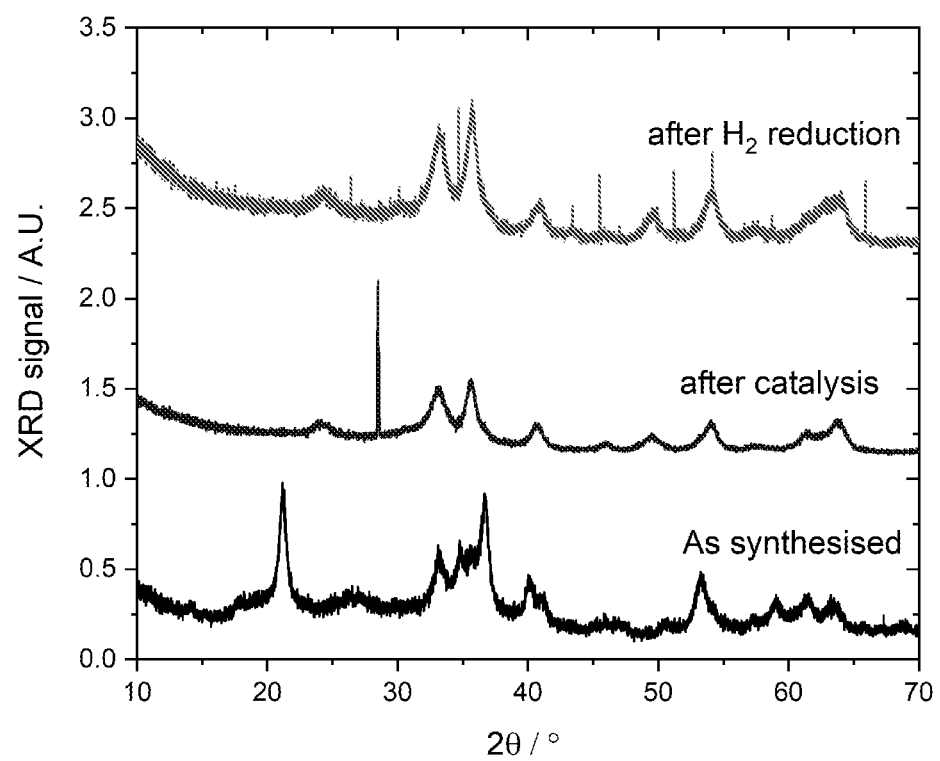
FIG. 4 shows an x-ray diffraction pattern for the catalyst as synthesised (lower line), after catalysis (middle line) and after $H_2$ reduction (upper line). Some sharp peaks present in the patterns measured for samples after catalysis and after $H_2$ are instrumental artefacts, caused by cosmic rays and other sources of noise on the detector.

FIG. 4 shows the results from which it can be seen that the catalyst is not wholly amorphous. It was previously assumed that the goethite (Fe oxy-hydroxide) pattern present in the material as synthesised was a minor component, however it seems likely that this in fact contains all of the Fe content of the material, with an associated amorphous Si containing component. On heating, water is released from the sample as the goethite transforms to hematite (broad peaks visible in the patterns measured after catalysis and after H$_2$ reduction). This suggests that the catalyst is different from the structure used in the electronic structure calculations. However, the key factor of that structure is that three Fe centres are required to be rather close together, which could conceivably occur at the interface between Fe and Si rich domains. The structural transformation on heating may be what is required to produce activity in the catalyst (both the flow tube experiments and engine trials show improved activity after some heating). This is further evidence that improved coating methodologies might improve the performance of the catalyst.

Transmission Electron Microscopy

High resolution images were obtained of an as synthesised and a heat activated catalyst sample using a Transmission Electron Microscope (TEM—Titan Krios, ThermoFisher) equipped electron diffraction, Energy Dispersive X-Ray Spectroscopy (EDS) and Electron Energy Loss Spectroscopy (EELS).

Figure 5:
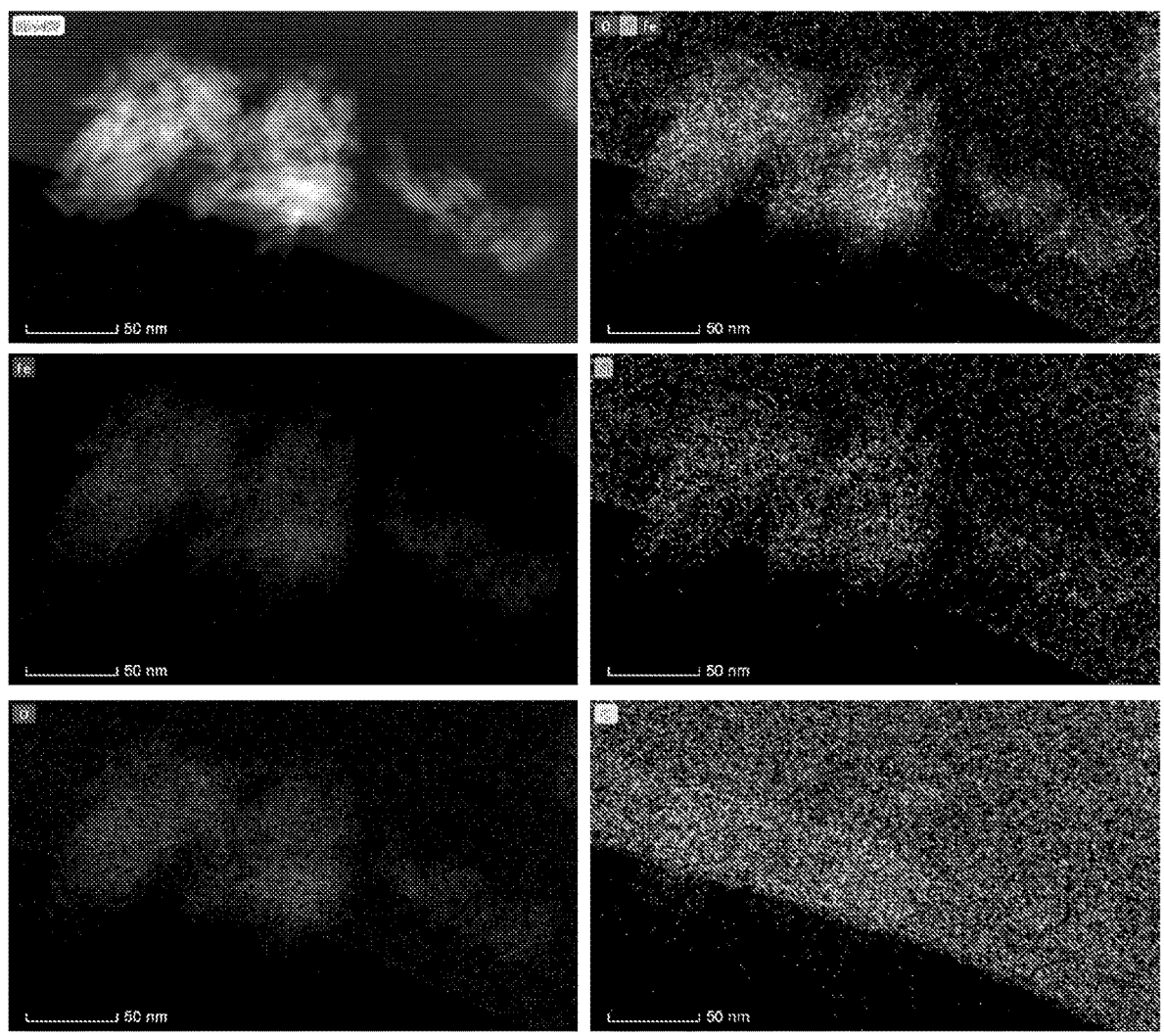
FIG. 5 shows a Transmission Electron Microscope (TEM) bright field image (HAADF) and Energy Dispersive X-ray (EDX) Spectroscopy composition maps of a sample of the catalyst as synthesised showing that Fe and Si components are well mixed on a nanometre scale.

FIG. 5 shows an image and chemical composition maps of an as synthesised catalyst sample. This shows that on the nm scale Fe and Si are well mixed throughout the sample (Si is also present in the holy carbon support used for the sample). Electron diffraction showed that the sample was crystalline and EELS confirmed that the Fe centres have a charge of 3$^+$ and an octahedral coordination environment (data not show). Taken together this implies that the catalyst as synthesised is a rather unusual material composed of crystallites of goethite well mixed on a nm scale with amorphous silica.

FIG. 6 shows TEM data for a sample of the material which has been treated at elevated temperature to induce the dehydration to hematite, and has then been used in catalysis experiments. Panels (c), (d) and (f) show that whilst Si is ubiquitous throughout the particle, Fe appears only in certain areas, corresponding to bright nano-particles in the bright field images. In contrast the smoother, less bright regions show only Si content. Panel (g) shows that these Fe bearing nano-particles are well ordered, showing regular planes of atoms, whilst regions lacking Fe do not show ordering. This is in agreement with powder X-Ray Diffraction patterns of this sample, which show only a hematite phase, no crystalline Si containing phases. Panel (h) shows detail of the inter-planar and inter-atomic spacing in the well-ordered Fe bearing phase. The plane spacing of 2.7±0.2 Å is consistent with a hematite crystal face. The interatomic Fe distances measured for this face average 2.8±0.8 Å, sufficiently close to allow groups of three Fe atoms to catalyse the reduction of NO$_x$ as described in the theoretical work presented here. It is likely that other planes are exposed elsewhere in the sample, some of which may not present three Fe centres sufficiently close to facilitate this chemistry. Nevertheless, we can conclude that some surfaces are present within the sample which are consistent with our theoretical explanation of the observed reactivity of the catalyst.

The data shown in FIGS. 5 and 6 corresponds to the iron rich end member of the series of materials of olivine composition (based upon a forsterite-fayalite combination). Where significant Mg is present there is very little crystalline content. In contrast, high resolution electron microscope imaging and electron diffraction data for the Fe rich version of the material shows that the Fe is mostly present in crystalline phases. It is believed that the Fe$_2$SiO$_4$ material remains of olivine bulk chemical composition, despite its having separated into crystalline iron oxide/hydroxide nanoparticles supported by an amorphous Silicon phase. However, it is not possible to say conclusively that all of the Fe content is present as crystalline goethite in the as synthesised material or as hematite following dehydration of the sample. Some Fe may still be present in amorphous phases in both cases. The observation of amorphous regions containing negligible Fe in the sample after catalysis experiments suggests that all the Fe in these regions was present as goethite and was separated from the amorphous silica during dehydration of goethite to hematite. However since there is still significant mixed Si and Fe in the sample after processing it is still possible that some Fe in present in amorphous phases.

This is significantly different to other dual material catalysts where there is a simple use of one material co-deposited to support another, since the active material is significantly transformed after deposition to the support. The presence of the Si matrix during dehydration from goethite to hematite likely facilitates the formation of the hematite as nanoparticles rather than larger crystallites. The hematite nanoparticles are then held separate in the amorphous silica matrix, which may then stabilise the large active surface area over prolonged use at high temperature.

Example 1: NO Reduction

FIG. 7 shows a catalytic reduction of NO, with simultaneous CO oxidation at 240° C. NO, NH$_3$, O$_2$ and CO are consumed, whilst N$_2$, H$_2$O and CO$_2$ are produced. The slow onset of the loss in NH$_3$ suggests that NH$_3$ was only consumed after the surface had been processed in some way. In the absence of O$_2$ and NO$_2$ none of the other losses or productions was observed. Both observations are consistent with the proposed mechanism, where surface O must be produced from O$_2$ or NO$_2$ before NH$_3$ can be taken up. No reaction was observed when NO and CO, or CO and NH$_3$, were passed over a catalyst sample without the third reactant, suggesting that no competing mechanisms involving reduction or oxidation with CO exist.

Due to the absence of $NO_2$, NO reduction was not observable below 175° C. A temperature dependence for reduction in the absence of $NO_2$ is in agreement with the small endothermicity of the reaction from FIG. 2(c) to FIG. 2(d). This indicates that for low temperature reduction to be achieved, $NO_2$ must be present. As exhaust gases are generally a mixture of NOx, the option of low temperature reduction would generally be available.

Example 2: Kinetic Order in NO and $NH_3$

In order to probe the number of molecules involved in certain key reaction steps, the dependence of reactant conversions on concentration of NO and $NH_3$ was determined. At low concentrations, both NO and $NH_3$ show a first order contribution to the conversions. The positive intercept evident when $NH_3$ is rate limiting indicates that NO does not react directly with $NH_3$, and thus continues to react to some extent in the absence of the reducing agent. This implies that the presence of the reductant is not essential to the reduction process, and that other mechanisms are available.

The results are consistent with the mechanism proposed in FIG. 2. At low concentrations of NO, the production of lone O is rate limiting and requires one molecular equivalent of NO. At low $NH_3$ it is ambiguous whether production of the structure of FIG. 2 (e) or (h) is rate limiting, though since the concentration of lone O is important, it seems likely that production of the structure of FIG. 2(e) would be the rate limiting step. In either case, the mechanism suggested here involves two steps which involve single equivalents of $NH_3$. This does not rule out stepwise formation of a trimolecular intermediate, but does rule out simultaneous reaction of two equivalents of $NH_3$ with $NO_2$ when the catalyst is used as an SCR catalyst.

FIG. 8 illustrates the kinetic order of the rate determining step where either NO or $NH_3$ are rate limiting. Linear relationships indicate first order kinetics ([γ] indicates concentration of whichever reactant is not designated x for that data set).

Example 3: $NO_2$ Reduction at Room Temperature

FIG. 9 shows that catalytic reduction of $NO_2$ by $NH_3$ was rapid at room temperature. $NO_2$ and $NH_3$ are both consumed nearly completely (minimum $NH_3$ signal is twice the standard deviation of the background) and $N_2$ is produced. When the same reaction is carried out at higher temperatures $H_2O$ is also observed, suggesting that at room temperature $H_2O$ is also produced but remains bound to the catalyst surface. Modest uptake of $H_2O$ and mass/charge (m/z)=44, most likely $CO_2$, (both present in the gas flow as contaminants) was also observed. Fragmentation of the $NO_2^+$ after electron impact ionisation in the mass spectrometer produces signal at m/z=30 ($NO^+$), as well as the parent ion at m/z=46 ($NO_2^+$). The ratio of these two signals was constant in the background measurements, but varied when the gas flow was in contact with the catalyst. This suggests that some $NO_2$ was converted to NO during the catalysis process, but that this was then reduced to $N_2$.

These results are consistent with the significantly exothermic nature of the pathway of FIG. 2 from structure 2(i) to structure 2(d). In contrast to forming structure 2(d) from O2, high temperatures are not needed to provide a thermodynamic driver for the reaction, and $NO_x$ reduction is possible at lower temperatures with even higher conversion efficiencies.

In order to quantify the temperature dependence of the catalytic activity in the reduction of $NO_2$, $NO_2$ update experiments were performed as a function of temperature between 22° C. and 362° C. Between each $NO_2$ uptake experiment the surface was saturated with $NH_3$ to reactively remove bound $NO_2$ and reduce the surface. FIG. 10 provides an illustrative result, clearly showing that once the surface is saturated with $NO_2$, repeat exposure does not result in further $NO_2$ uptake to the surface. Subsequent introduction of $NH_3$ leads to regeneration of the surface resulting in the unexpected observation that oxidation of the surface by $NO_2$ leaves the catalyst in a long lived intermediate chemical state (30% of the surface was found to be still saturated after eight days under vacuum). This implies that when associated with an engine, the catalyst may remain in an active state between uses.

FIG. 11 shows the production of $N_2$ and loss of $NH_3$ and $NO_2$ (corrected for the mass spectrometer sensitivity) from a catalysis experiment at 229.2° C. Also shown is the difference between the $NO_2$ lost (based on the m/z=46 signal) and the $N_2$ produced as a function of time. This exhibits a very similar shape to the signal at m/z=30 (after correction for fragmented $NO_2$ based on a ratio to the m/z=46 signal), suggesting that $NO_2$ loss first produces NO, which is then further converted to $N_2$, in a 1:1:1 stoichiometry i.e. in agreement with the chemistry shown in FIG. 2. This quantitative stoichiometry, and the catalysis in the absence of $O_2$ are also consistent with the mechanism in FIG. 2 in that the role of $NO_2$ is to replace $O_2$ as the source of the lone O which allows $NH_3$ uptake and subsequent NO reduction. Such efficient $NO_2$ reduction at room temperature represents a significant improvement over commercial SCR technologies, which typically have light off temperatures for $NO_x$ reduction of at least 200° C.

Example 4: Temperature Dependence of the Catalyst

To investigate the real world viability of the catalyst as an SCR material, the temperature dependence of NO and $NO_2$ catalysis was assessed. NO and $NO_2$ uptake and catalysis reactions were performed over a range of temperatures from room temperature to 420° C. for the uptake experiment and 362° C. for the catalysis reaction. To retrieve uptake coefficients, $\gamma_{NO}$ and $\gamma_{NO2}$, kinetic models based on E1 (above) were developed. The flow tube was treated as a single volume containing catalyst of a variable γ and $a_s$. The experimental pressure, temperature and gas concentrations were used to determine the rate of uptake at any given time by E1. Uptake over each time step (set to the residence time) was calculated and the reduction in surface area taken to be $2.5 \times 10^{-15}$ $cm^2$ $molecule^{-1}$. The resulting new surface area was used to calculate a new rate of uptake in the next time step. This model was able to derive γ and $a_s$ independently from uptake experiments, provided that surface saturation on the experimental timescale led to an observable decrease in uptake over time. This is shown for two NO uptake experiments in FIG. 12, which demonstrates the different effect predicted by changing γ and $a_s$. A change in γ affects the slope of the concentration over time, whereas the initial surface area available shifts the uptake uniformly across time. The underestimation of uptake by the model at longer experimental times may indicate that the gas can access deeper into the catalyst sample as the uppermost surface becomes saturated.

FIG. 13(a) shows the resulting trend in $\gamma_{NO}$ and $\gamma_{NO2}$ with temperature. The larger uptake coefficients for $NO_2$ reflect the more active catalysis reduction process. The stronger temperature dependence of the NO reduction (steeper slope in FIG. 13(a)) is in agreement with the modelling shown in FIG. 2. Specifically, the thermoneutral nature of the NO uptake and the exothermic nature of the oxidation by $NO_2$ (both processes are free of significant energetic barriers). $\gamma_{NO}$ was used alongside the NO signal loss in catalysis experiments to assess the surface area coated with O (formed by R1 following uptake of NO). This surface area was then used with the $NH_3$ signal to determine the uptake coefficient for $NH_3$. The resulting values of $\gamma_{NH3}$ are shown in FIG. 13(b) and this data processing procedure is summarised schematically in FIG. 13(c).

FIG. 14(a) shows the predicted conversion of NO by the catalyst. FIG. 14(b) shows the predictive conversion of $NO_2$ by the catalyst. The horizontal axis shows the amount of catalyst present in the exhaust flow. For NO the light off temperature (i.e. the temperature at which 50% of NO would be reduced as shown), and for $NO_2$ the amount converted to 100° C. (the approximate stable temperature for exhaust when an engine runs under idle load) is provided.

Example 5: Calculation of Light-off Temperature

Quantified NO reduction over a temperature range allows prediction of light-off temperature, $T_{50}$. This is calculated using a model based on E1. To allow application of the results to a range of engine exhaust conditions, the volumetric surface area and the residence time are selected as free parameters. In practice this was done by fixing the volume to that of a typical catalytic converter monolith 650 $cm^3$ and varying the surface area from the geometric surface area of such a monolith (16500 $cm^2$) up to 40,000 times that value (the approximate ratio between the geometric and BET surface areas of a 0.5 g sample of catalyst). Based on flow rates for a small diesel engine, the residence time in that volume was varied from 0.03 to 0.12 s. The conversion efficiency of $NH_3$ (equivalent to that of NO) was then calculated based on the temperature dependent $\gamma_{NO}$ expression shown in FIG. 12(b). This method inherently assumes that the modelled surface area is completely coated with O and $NH_3$, however since $O_2$ is extremely abundant in engine exhaust (generally >15% volumetrically) and the $NH_3$ added to the exhaust could be controlled to whatever level was needed, this assumption is reasonable.

The use of E1 is only valid where the loss from the gas phase is controlled by uptake to the surface, not diffusion through the gas phase. This is valid either where the pressure is sufficiently low (such as in the flow tube experiments described above), or where the flow conditions allow for sufficiently fast diffusion. To assess this, the diffusion limited loss rate under laminar flow conditions was calculated and compared to the uptake limited rate. In a typical catalyst monolith the flow is significantly turbulent (Reynoulds number ~$10^5$), so the diffusion limited rate calculated here represents a lower limit. In a very few cases the diffusion limited rate was found to be of the same order of magnitude as the uptake limited rate. However since this was the lower limit, the assumption that E1 applies was taken to be reasonable.

FIGS. 14(a) and 14(b) show the calculated $T_{50}$ and conversion at 100° C. values, respectively. It is clear that for a generic engine exhaust flow and catalyst monolith it is reasonable to expect measurable $NO_x$ reduction by the catalyst material. Indeed in some cases $NO_x$ reduction by the NO mechanism alone gives results which are comparable to known commercial materials, which have $T_{50}$ around 200° C. Given the known CO oxidation behaviour of the catalyst, the catalyst material clearly represents a significant breakthrough in cheap and effective catalytic conversion of diesel engine exhaust.

The observed low temperature efficiency of $NO_2$ reduction is particularly interesting as diesel engines produce predominantly $NO_2$ at lower temperatures and NO at higher temperatures due to changes in the completeness of combustion of hydrocarbon fuels and resulting available oxygen. This makes the catalyst highly appropriate for cold start and urban congested traffic applications and opens up the potential for use in static road side conversion in areas of high NOR pollution. These regions often also have high $O_3$ concentrations and a resulting equilibrium exists between NO and $NO_2$, meaning that the catalyst would potentially reduce not only the $NO_2$ but also some of the NO after conversion by $O_3$.

Example 6: Preliminary Engine Tests

Preliminary diesel engine tests were completed including a catalytic converter comprising the catalyst, deposited onto a stainless steel monolith and dried (3 kW engine load, ~250° C., ~300 ppm NO with no significant $NO_2$). In the temperature range 115° C. to 265° C., in the presence of $NH_3$, the catalyst converted 8±1% of NOR. The freshly coated catalysts displayed an initial increase in activation up to the performance described above, suggesting that thermal treatment could further improve performance.

Some trials at lower engine load (90° C., 60 ppm total NOR of which 52% was NO) showed improved performance as compared to the experiments shown in FIG. 13. Specifically, FIG. 15 shows a significant conversion of $NO_2$ at some percentages of $NH_3$, this is over 40%. This could indicate that as temperature dependent NO conversion decreases, $NO_2$ conversion increases and compensate. Indeed, the levels of activity at lower temperatures cannot be explained by the kinetics of NO conversion measured in the flow tube, suggesting that $NO_2$ conversion dominates.

Optimisation of the engine setup (e.g. residence time, flow rate passing through the catalyst, mixing of reactants) and of the catalytic monolith (e.g. amount of catalyst, catalytic coating method presence of water, surface topology and area) would be expected to increase the conversion rate of NOR.

Using the logic of assuming that the laboratory quantified kinetics are accurate and considering the surface area required to explain the observed reduction of NOR, the agreement between the two experiments can be tested. Surface areas of 125±25 times the geometric surface area of the catalyst monolith are required to explain the observed loss of NO at 520 K, assuming that the quantified kinetics shown in FIG. 13(b) are correct. This is within the range of available surface areas used to fit the flow tube uptake experiment data. The flow tube and engine trials can thus be explained by a consistent uptake kinetics, with reasonable assumptions of surface area, giving confidence in both experiments. These results are shown in FIGS. 16(a) and 16(b) which clearly illustrate the experimental and modelled agreement for these exhaust conditions.

It would be appreciated that the process and apparatus of the invention are capable of being implemented in a variety of ways, only a few of which have been illustrated and described above.

EEA (2017), Air quality in Europe—2017 reportRep., Copenhagen, Denmark.

Frankland, V. L., A. D. James, J.-D. Carrillo-Sánchez, T. P. Mangan, K. Willacy, A. R. Poppe, and J. M. C. Plane (2016), Uptake of acetylene on cosmic dust and production of benzene in Titan's atmosphere, *Icarus*, 278, 88-99, doi:https://doi.org/10.1016/j.icarus.2016.06.007.

Frankland, V. L., A. D. James, J. D. Carrillo-Sánchez, D. Nesvorný, P. Pokorný, and J. M. C. Plane (2017), CO oxidation and $O_2$ removal on meteoric material in Venus' atmosphere, *Icarus*, 296, 150-162, doi:https://doi.org/10.1016/j.icarus.2017.06.005.

Frisch, M. J., et al. (2016), Gaussian 16 Rev. B.01, edited, Wallingford, CT.

Hoek, G., B. Brunekreef, S. Goldbohm, P. Fischer, and P. A. van den Brandt (2002), Association between mortality and indicators of traffic-related air pollution in the Netherlands: a cohort study, *Lancet* (London, England), 360 (9341), 1203-1209, doi:10.1016/s0140-6736(02)11280-3.

James, A. D. (2016), Impacts of Meteoric Material on Earth's Atmosphere: Laboratory studies with Atmospheric Implications, University of Leeds, University of Leeds.

James, A. D., V. L. F. Frankland, J. M. Trigo-Rodriguez, J. Alonso-Azćarate, J. C. Gómez Martín, and J. M. C. Plane (2017), Synthesis and characterisation of analogues for interplanetary dust and meteoric smoke particles, *J. Atmos. Sol.-Terr. Phys.*, doi:http://dx.doi.org/10.1016/j.jastp.2016.08.011.

Kašpar, J., P. Fornasiero, and N. Hickey (2003), Automotive catalytic converters: current status and some perspectives, *Cat. Today*, 77(4), 419-449, doi:https://doi.org/10.1016/50920-5861(02)00384-X.

Krasnopolsky, V. A. (2007), Chemical kinetic model for the lower atmosphere of Venus, *Icarus*, 191(1), 25-37, doi: https://doi.org/10.1016/j.icarus.2007.04.028.

Long, R. Q., and R. T. Yang (2002), Reaction mechanism of selective catalytic reduction of NO with $NH_3$ over Fe-ZSM-5 catalyst, *J. Cat.*, 207(2), 224-231, doi:https://doi.org/10.1006/jcat.2002.3528.

Ntziachristos, L., G. Papadimitriou, N. Ligterink, and S. Hausberger (2016), Implications of diesel emissions control failures to emission factors and road transport NOx evolution, *Atmos. Env.*, 141, 542-551, doi:https://doi.org/10.1016/j.atmosenv.2016.07.036. Saunders, R. W., S. Dhomse, W. S. Tian, M. P. Chipperfield, and J. M. C. Plane (2012), Interactions of meteoric smoke particles with sulphuric acid in the Earth's stratosphere, *Atmos. Chem. Phys.*, 12(10), 4387-4398, doi: 10.5194/acp-12-4387-2012.

Zhang, D., and R. T. Yang (2017), $NH_3$—SCR of NO over one-pot Cu-SAPO-34 catalyst: Performance enhancement by doping Fe and MnCe and insight into $N_2O$ formation, *Appl. Cat. A: General*, 543, 247-256, doi:https://doi.org/10.1016/j.apcata.2017.06.021.

What is claimed is:

1. A catalytic converter including a catalyst, the catalyst comprising a material of olivine composition, wherein the material has the formula: $Mg_xFe_{2-x}SO_4$ wherein x is in the range of 0-2; and wherein the material comprises a combination of crystalline and amorphous regions.

2. The catalytic converter according to claim 1, wherein x is in the range 0.1-2.

3. The catalytic converter according to claim 1, wherein the crystalline regions comprise iron-containing compounds.

4. The catalytic converter according to claim 3, wherein the iron-containing compounds are selected from a group consisting of iron silicate, iron oxide, iron oxide-hydroxide and combinations of any two or more thereof.

5. The catalytic converter according to claim 1, wherein the material has a specific surface area in the range 200-300 $m^2g^{-1}$.

6. The catalytic converter according to claim 1, the catalytic converter further comprising a reductant.

7. The catalytic converter according to claim 6, wherein the reductant comprises ammonia.

8. An engine comprising the catalytic converter according to claim 1.

9. The engine according to claim 8, wherein the engine is a diesel engine.

10. The engine according to claim 8, wherein the engine is selected from a static engine or a vehicle engine.

11. A method of producing nitrogen from NOx comprising the catalytic reduction of NOx by a catalyst, the catalyst comprising a material of olivine composition, wherein the material has the formula: $Mg_xFe_{2-x}SO_4$ wherein x is in the range of 0-2; and wherein the material comprises a combination of crystalline and amorphous regions.

12. The method of claim 11, wherein the reduction of NOx is in the presence of reductant.

13. The method of claim 11, wherein the reduction of NOx occurs at room temperature.

14. The method of claim 11, wherein in the presence of carbon monoxide, the catalyst oxidises carbon monoxide to carbon dioxide.

15. The method of claim 14, wherein the NOx and/or carbon monoxide are from an engine exhaust gas stream.

16. A method of manufacture of the catalytic converter of claim 1, the method comprising adding the catalyst to a wash coat, applying the catalyst-containing wash coat to a substrate and firing the coated substrate.

17. The method of claim 16 comprising the additional step of removing by-products from the substrate prior to firing.

18. The method of claim 16, wherein the substrate is a stainless steel or a ceramic material.

* * * * *